T. SLOPER.
MANUFACTURE OF RUBBER GOODS AND THE LIKE.
APPLICATION FILED JAN. 11, 1917.
1,232,110. Patented July 3, 1917.
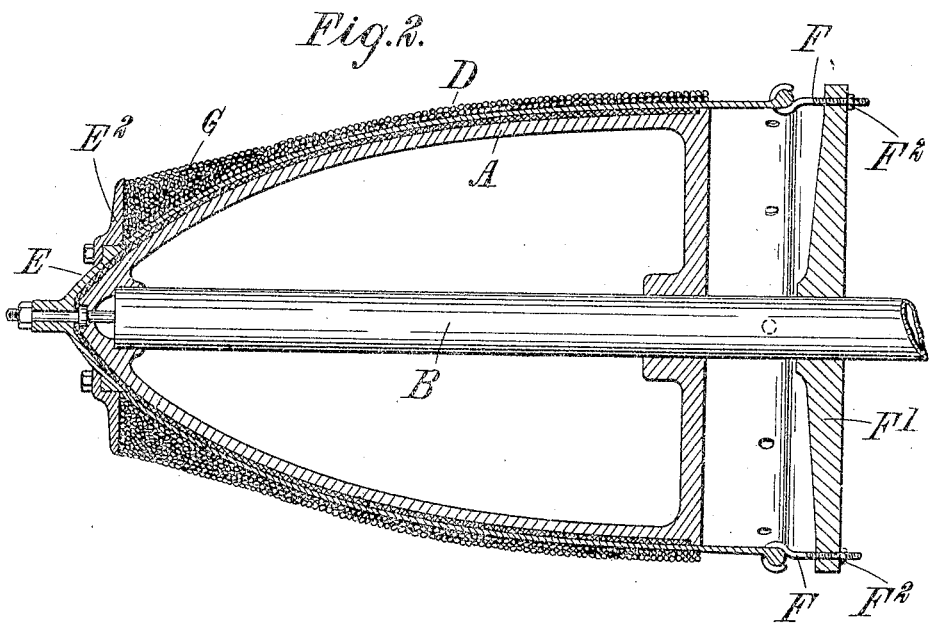
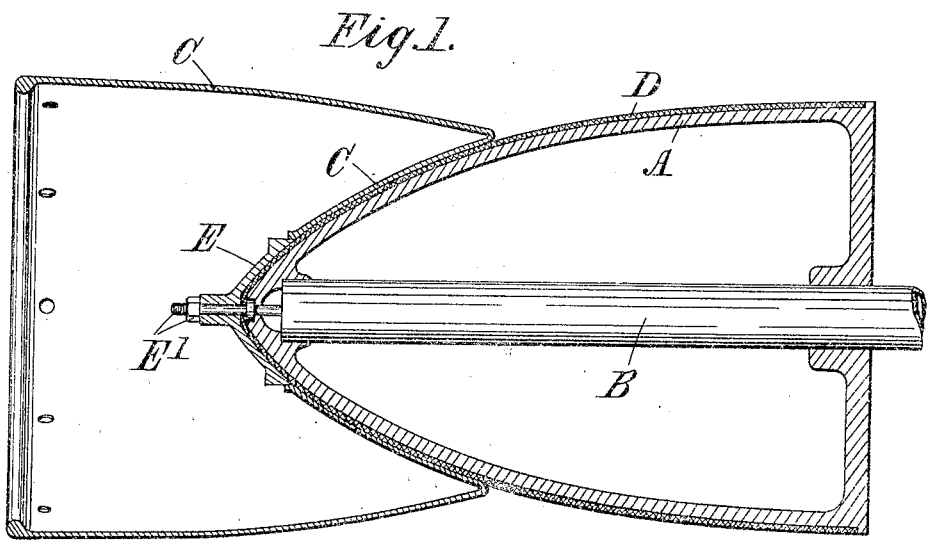
Witnesses.
Inventor
Thomas Sloper,
by Bakewell, Byrnes & Parmelee,
attys

UNITED STATES PATENT OFFICE.

THOMAS SLOPER, OF DEVIZES, ENGLAND.

MANUFACTURE OF RUBBER GOODS AND THE LIKE.

1,232,110.   Specification of Letters Patent.   Patented July 3, 1917.

Application filed January 11, 1917. Serial No. 141,784.

*To all whom it may concern:*

Be it known that I, THOMAS SLOPER, a subject of the King of England, residing at Devizes, in Wiltshire, England, have invented certain new and useful Improvements in the Manufacture of Rubber Goods and the like, of which the following is a specification.

This invention is for improvements in or relating to the manufacture of tapered air-chambers for use with aircraft, the material of which the chambers are to be made being referred to throughout as "rubbered material" because in most cases it would consist of cords or canvas coated or permeated with rubber, but the term will also be understood to include materials treated with other substances, for example oil compounds which, though not vulcanizable, require to be maintained under pressure until they are properly set.

Air-chambers built up according to my earlier United States patent specifications No. 1118451 dated 24th November 1914 and No. 1140921 dated 25th May 1915, are of considerable size, so that some difficulty has been experienced in maintaining the walls of the chambers under pressure during vulcanizing or during such period as the material requires for setting if it is a non-vulcanizable material. The air-chambers are built up in sections as shown in the prior specifications referred to, and by means of the present invention the separate sections can be easily put under the requisite pressure for vulcanizing or setting.

The process for the manufacture of tapered air-chamber sections according to this invention consists in stretching an envelop tightly over each tapered section after the latter has been formed but before it is vulcanized or allowed to set and securing a binding over the envelop, for the purpose of applying the required pressure to the article during vulcanizing or setting.

The air-chamber sections are built on a conical, or partly conical, "former," and the process may then consist in the following steps:—(a) building up a section on the "former" (for example by applying layers of rubbered cord), (b) stretching a tightly fitting envelop (for example of canvas surfaced with rubber and vulcanized together) over the whole of the air-chamber section previously built up, and (c) applying a winding of cord or other binding material to the exterior of the envelop prior to the section being vulcanized or allowed to set. To apply the envelop it is preferably turned inside-out, the small end then first applied to the small end of the said section while still on the "former," and the envelop is then worked on by re-turning it. The large end may be strained in the direction to keep the small end pressed home against the corresponding end of the chamber section on the "former" and to keep the envelop from moving toward the smaller end.

In the accompanying drawings which illustrate one method of carrying out this invention:—

Figure 1 is a section through a conical "former" with a rubber air-chamber section built thereon and the envelop partly applied thereto, and Fig. 2 is a section through the same parts with the envelop fully applied and covered with the binding material.

The same letters indicate the same parts in both figures.

A hollow conical "former" A is carried on a shaft B which is mounted in any convenient manner so that it can be readily rotated, and an envelop C of rubbered canvas is first built up on the exterior of this "former" in any well-known manner; the inside of the envelop may be covered with rubber to give it a smooth surface. After vulcanization, the envelop is removed from the "former" and a shell D of rubbered material is built up on the "former" by laying thereon cords permeated or coated with rubber. This shell when completed constitutes the required tapered air-chamber section and is intended to be connected to one or more other sections by suitable fittings such as the joint described in the prior U. S. specification No. 118451 dated 24th November 1914 already referred to. No means for connecting one section to another are shown in the present drawings as such means do not constitute any part of the present invention. The fabric D now needs to be covered with the envelop C, the manufacture of which has been previously described, and as this was molded on the same "former" as the fabric is built upon, it will be appreciated that the envelop will have to be stretched on to the fabric as it is smaller internally than the fabric is externally. Preferably the end of the envelop is not carried to the end of the "former," so that in shape it represents a truncated cone, and that part of the fabric which would thus project through the end of the envelop is covered by a metal cap E which is secured to the shaft B by a bolt and nut E¹, which bolt extends through the "former" A.

To apply the envelop, the latter is turned inside-out and the small end is then applied to the small end of the "former" with the fabric D thereon. In Fig. 1 the envelop is shown with the small end in position and the rest is brought into position by drawing the large end over so that the envelop finally is inverted. The small end may be secured by any convenient means to the cap E, or it may merely butt against the same. To fully stretch the envelop over the fabric D, straining hooks F may be employed which are carried by a disk or spider F¹ on the shaft B. The hooks slide freely through the arms of the spider or the flange of the disk and are provided with nuts F². It follows therefore that when the hooks are engaged with the edge of the envelop C, the nuts can be tightened up to put a strain upon the envelop and complete the stretching of the same into position.

A flange-plate E² is then secured to the cap E and binding material G is wound on the envelop to put the required pressure upon the fabric D; the "former" with the fabric, envelop, and binding material thereon is then placed bodily in a vulcanizing-chamber and vulcanized in the ordinary manner.

It is important that the envelop C shall be stretched tightly on the fabric D, as otherwise it tends to slip down the tapered structure when the rubber becomes plastic in the vulcanizing-chamber. In some cases the straining-device is not necessary, but where there is a considerable taper, this device further insures that the envelop shall not slip. The flange E² also prevents the binding from slipping, and enables it to be easily wound in position.

After vulcanizing, the binding material is wound off, the flange E² removed, and the envelop, after it has been released from the straining-device, can then be taken off by again turning it inside-out. Finally, the cap E is removed and the fabric D can then be taken off the "former."

It will be appreciated that if the air-chamber section D is built of material which is not vulcanizable, but merely requires to be allowed to set, the vulcanizing process is omitted, or the apparatus may be heated merely to amalgamate the material.

The use of this envelop has many advantages. It prevents marking of the wall of the chamber by the binding material and it tends to hold the chamber portion well in place at the tapered end.

If desired, the envelop may be made of canvas cut on the bias, so that when pulled endwise, it tends to contact laterally and thus increases the pressure on the chamber-section within.

In some cases it is preferred to apply the envelop to the air-chamber section by merely pulling it straight on to the tapered section without first turning it inside-out and then re-turning it.

What I claim as my invention and desire to secure by Letters Patent is:—

1. A process for the manufacture of tapered air-chamber sections consisting in stretching a tapered envelop tightly over each tapered section while on a "former" after the latter has been formed but before it is vulcanized or allowed to set and securing a binding over the envelop for the purpose of applying the required pressure to the article during vulcanizing or setting, substantially as set forth.

2. A process for building up tapered air-chamber sections consisting in building up a section on a conical former, stretching a tightly fitting envelop of tapered form over the whole of the air-chamber section while on the former, and applying a winding of binding material to the exterior of the envelop prior to the said section being vulcanized or allowed to set, substantially as set forth.

3. A process for the manufacture of tapered air-chamber sections comprising the steps of building up a section on a conical former, stretching a tightly fitting envelop of tapered form over the whole of the air-chamber section while still on the former by first turning the envelop inside-out and then applying the small end of the same to the small end of the tapered section and re-turning it on to the air-chamber section, and then applying a winding of binding material to the exterior of the envelop prior to the said section being vulcanized or allowed to set, substantially as set forth.

4. A process for building up tapered air-chamber sections, comprising the steps of building up a section on a conical former, then stretching a tightly-fitting envelop of tapered form over the whole of the air-chamber section while still on the former, then applying a winding of binding material to the exterior of the envelop prior to the said section being vulcanized or allowed to set, and mechanically maintaining a pull on the large end of the envelop in such direction as to stretch it on the tapered section on the former which pull is maintained during vulcanizing or setting, substantially as set forth.

5. A process for building up tapered air-chamber sections, comprising the steps of first building a conical envelop on a conical former, removing the envelop from the former, then building up an air-chamber section on the former, stretching the envelop previously built on the former over the whole of the air-chamber section while on the former, and finally applying a winding of binding material to the exterior of the envelop prior to the said section being vulcanized or allowed to set, substantially as set forth.

In testimony whereof I have signed my name to this specification in the presence of two subscribing witnesses.

THOMAS SLOPER.

Witnesses:
M. MELLOR,
H. S. BURSLEY.